United States Patent
Albert

(10) Patent No.: US 9,890,769 B1
(45) Date of Patent: Feb. 13, 2018

(54) HOT AIR ELECTRIC GENERATING SYSTEMS

(71) Applicant: Barry Albert, Petersburg, VA (US)

(72) Inventor: Barry Albert, Petersburg, VA (US)

(*) Notice: Subject to any disclaimer, the term of this patent is extended or adjusted under 35 U.S.C. 154(b) by 97 days.

(21) Appl. No.: 14/935,359

(22) Filed: Nov. 6, 2015

Related U.S. Application Data

(60) Provisional application No. 62/123,363, filed on Nov. 17, 2014.

(51) Int. Cl.
*F01K 27/00* (2006.01)
*F03G 7/04* (2006.01)

(52) U.S. Cl.
CPC ........................... *F03G 7/04* (2013.01)

(58) Field of Classification Search
CPC ... F05B 2240/131; Y02E 10/465; F03G 6/045
See application file for complete search history.

(56) References Cited

U.S. PATENT DOCUMENTS

| | | | | |
|---|---|---|---|---|
| 4,118,636 A * | 10/1978 | Christian | ............... | F03D 9/007 290/52 |
| 4,379,972 A | 4/1983 | Sosa et al. | | |
| 6,016,015 A * | 1/2000 | Willard, Jr. | ............... | F03D 1/04 290/54 |
| 6,201,313 B1 * | 3/2001 | Nakamats | ............... | F03D 9/007 290/43 |
| 6,582,291 B2 | 6/2003 | Clark | | |
| 8,368,240 B1 | 2/2013 | Burkett | | |
| 9,097,241 B1 * | 8/2015 | Hollick | ............... | F03G 6/045 |
| 2003/0217551 A1 * | 11/2003 | Drucker | ............... | F03D 1/04 60/641.12 |
| 2004/0206086 A1 * | 10/2004 | Kim | ............... | F03D 1/04 60/641.8 |
| 2004/0250543 A1 * | 12/2004 | Yeh | ............... | F03D 9/007 60/641.8 |
| 2009/0107146 A1 * | 4/2009 | Lin | ............... | F03G 6/045 60/641.8 |
| 2010/0018205 A1 * | 1/2010 | Chen | ............... | F03D 1/04 60/641.8 |
| 2010/0230973 A1 * | 9/2010 | Ortiz | ............... | B60K 16/00 290/55 |
| 2010/0314879 A1 * | 12/2010 | Otsuka | ............... | F03D 1/04 290/52 |
| 2012/0187698 A1 | 7/2012 | Bassett | | |
| 2014/0216031 A1 | 8/2014 | Hill, Jr. | | |
| 2015/0089946 A1 * | 4/2015 | Dofredo | ............... | F03G 6/045 60/641.12 |

* cited by examiner

*Primary Examiner* — Jesse Bogue
(74) *Attorney, Agent, or Firm* — Winston & Strawn LLP

(57) ABSTRACT

A system for generating energy from a confined space that includes heated air therein. The system includes a turbine operatively associated with at least one generator of electricity; and a funnel having an inner channel that is open and unobstructed from a larger bottom opening to a smaller top opening which is in air flow communication with the turbine. The inner channel is configured for accelerating heated air rising through the channel prior to exiting the top opening and entering the turbine. No additional energy is needed, such as the use of a fan or propeller, for this acceleration. The accelerated heated air more effectively drives the turbine without requiring additional energy to provide increased amounts of generated electricity and to do so more efficiently compared to turbine systems that do not contain a funnel and fan or propeller.

14 Claims, 6 Drawing Sheets

HOT AIR ELECTRIC GENERATING SYSTEMS

This application claims the benefit of U.S. provisional application No. 62/123,363 filed Nov. 17, 2014, the entire content of which is expressly incorporated herein by reference thereto.

FIELD OF THE INVENTION

The invention addresses the harnessing of hot air in an attic or other confined space to accelerate flow to drive a turbine and generator to produce electricity. In this way, attic air that is heated by the sun can be put to use to generate electricity.

BACKGROUND OF THE INVENTION

Due to rapidly rising energy costs, there is increased demand for low cost, eco-friendly ways to generate electricity. Harnessing airflow is a well known way of generating electricity that is sustainable and eco-friendly. A popular method of harnessing airflow is to use windmills but these rely on unpredictable wind sources. Additionally, windmills are often quite large and heavy and therefore limited as to where they can be installed. As such, they are generally not suitable for more widespread use.

An alternative to windmill generated power is to access the airflow energy inside and outside of buildings to generate electricity. Hot air electric generating systems, both home and commercial, use the movement of hot air, also called convention currents, to generate electricity. The hot air is naturally occurring, and harnessing it to produce electricity can be done in a clean, environmentally safe, and highly efficient way.

An example of an existing system for capturing hot air inside of a home or other building is described in U.S. Pat. No. 6,582,291. This system requires the installation of a conventional wind-powered turbine ventilator. The main purpose of the ventilator is to exhaust hot air accumulation within the building, in particular, under the roof. As hot air rises from under the roof, it flows through the ventilator and is exhausted into the atmosphere.

Other documents describe using captured hot air to generate electricity. One such example is described in U.S. Patent Application Publication No. 2014/0216031. This system captures hot air or other waste energy from household items such as furnaces, water heaters, hot attic ventilation systems, and dryer vents. By adding a sealed plenum or pressure transition tube, the waste energy is harnessed and focused to a turbine. This system uses a motor driven impeller to drive the hot air or other waste energy through a cone and into a turbine which is in mechanical communication with a generator, thus requiring additional energy to assist in generating electricity from the hot air itself.

Further examples of systems for harnessing hot air flow to generate electricity are described in U.S. Pat. No. 8,368,240 and in U.S. Patent Application Publication No. 2012/0187698. U.S. Pat. No. 8,368,240 discloses using a wind powered turbine vent to generate electricity. This device relies on the wind turbine turning through a combination of the outside wind, escaping hot air, and/or a fan that pushes air through the system via airflow connections. The device also includes the use of several batteries and/or solar panels which power the fan and an air guide that directs airflow to the turbine. U.S. Patent Application Publication No. 2012/0187698 describes a similar device that also uses a fan to force air flow to the turbine. Both systems require additional energy consumption devices to assist in generating energy from the hot air.

Accordingly, there exists a need for a less complicated system that is more energy efficient and that can be more easily installed and maintained. The present invention now satisfies this need.

SUMMARY OF THE INVENTION

The present invention provides a system for generating energy from a confined space that includes heated air therein. The system includes a turbine operatively associated with at least one generator of electricity; and a funnel having a relatively smaller top opening, a relatively larger bottom opening and an inner channel that is open and unobstructed from the bottom opening to the top opening. The top opening of the funnel is in air flow communication with the turbine, with the inner channel configured for accelerating heated air rising through the channel prior to exiting the top opening and entering the turbine simply due to the travel of the heated air through the inner channel of the funnel. To accelerate the heated air, no additional energy is needed, such as the use of a fan or propeller. Furthermore, the accelerated heated air more effectively drives the turbine without requiring additional energy to provide increased amounts of generated electricity and to do so more efficiently compared to turbine systems that do not contain a funnel and fan or propeller.

In this system, the funnel preferably has a conical or hyperbolic configuration and is constructed of metal or plastic. The funnel may be made as a single unit or it can be configured as two or more attachable sections that are connected to provide the desired funnel length.

Advantageously, the turbine includes foils or blades that are cupped to more efficiently be contacted by the accelerated heated air that enters the turbine. Also, a radiant barrier that reflects heat onto the funnel can be provided to further heat the increase airflow of the heated air. Typically, the turbine rotational speed is self-limiting. For optimum operation, multiple turbines and generators are connected in parallel to each other to produce electricity.

The system is preferably installed in a confined space such as an attic of a building and the turbine and generator are installed in the building in position to receive the accelerated heated air from the funnel. The turbine and generator are typically installed between roof joists of the building, but they also may be located adjacent the peak of the roof of the building. Further arrangements are also possible, with the system capable of being installed interiorly in the building and with the hot air is vented through the roof by wind turbines. Alternatively, the system may be installed interiorly in the building with the hot air is vented through the roof by way of ridge vents. Additionally, the system may be installed in an exterior wall of the building, and it can extend from the basement to the roof through the building if desired.

In a preferred arrangement, the system can also include a heat reflector for directing sun rays towards the confined space to assist in heating the air prior to its entry into the funnel. The heat reflector can also be used to direct sun rays to heat the funnel for greater acceleration of air movement therein.

Another embodiment of the invention is a method of generating energy from a confined space that includes heated air therein. This method comprises arranging one of the systems of the invention as disclosed herein in the confined space in a manner to receive the heated air therein; and accelerating the heated air that rises through the channel due to the travel of the heated air through the inner channel of the funnel without the use of a fan or propeller. Thus, the accelerated heated air more effectively drives the turbine without requiring additional energy to provide increased amounts of generated electricity and to do so more efficiently compared to turbine systems that do not contain a funnel and fan or propeller.

BRIEF DESCRIPTION OF THE DRAWINGS

The accompanying drawings are incorporated into and form a part of the specification to illustrate the preferred embodiments of the present invention. Various advantages and features of the invention will be understood from the following detailed description taken in connection with the appended claims and with reference to the attached drawing figures in which:

DETAILED DESCRIPTION OF THE INVENTION

Figure 1:
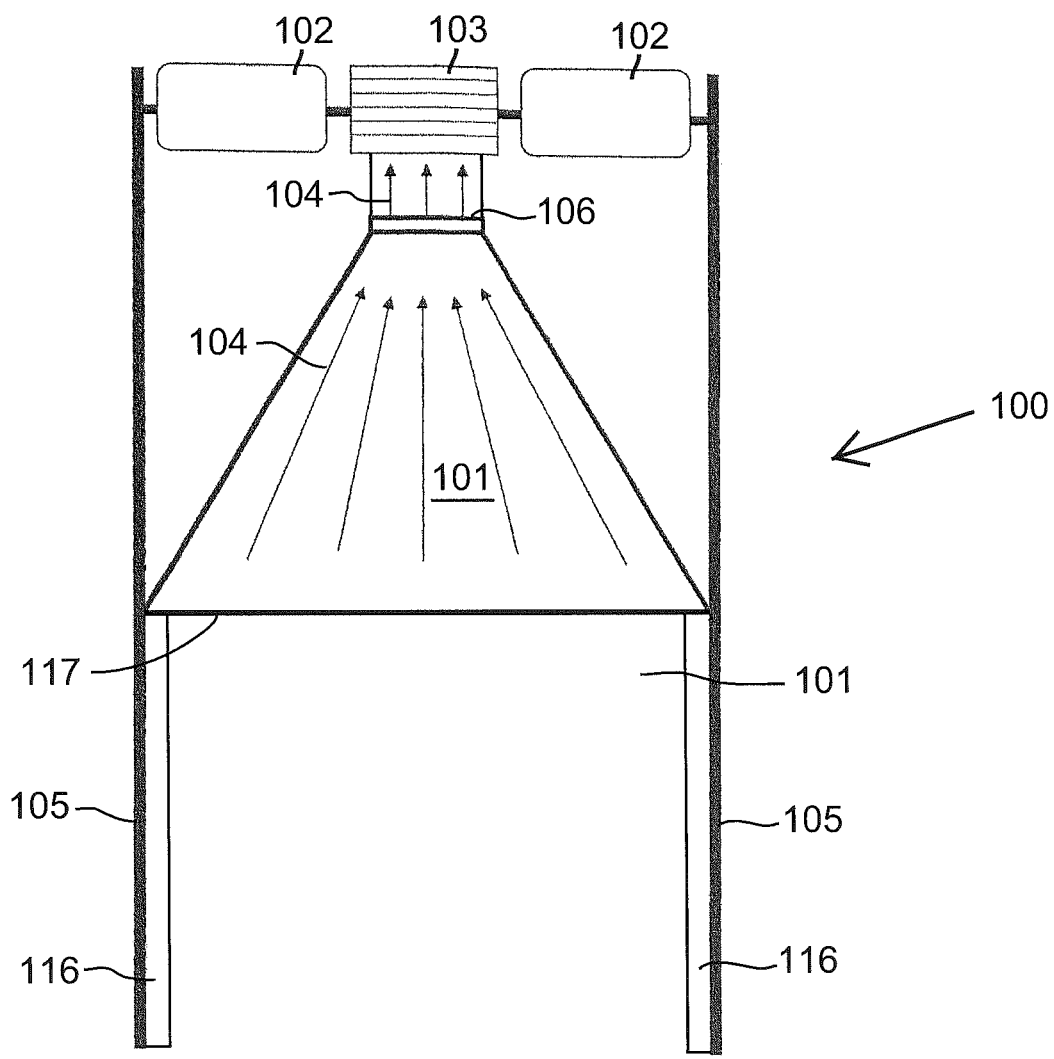
FIG. 1 is a front view of an embodiment of the present invention having a having a funnel with an inner channel that is open, a turbine, and two generators constructed according to the present invention.

Preferred embodiments of the present invention will now be described with reference to various examples of how the invention can best be made and used. The technical features described in this application can also be used to construct various systems and methods not described here. It will be apparent to a person of ordinary skill in the art, however, that the present invention may be practiced in other embodiments that depart from these specific details. Other designs can be inside or outside the home, with commercial and domestic power applications as well.

To promote an understanding of the principles of the present invention, reference will now be made to the embodiments illustrated in the drawings, and specific language will be used to describe the same. However, no limitation of the scope of this disclosure is intended.

Referring now to FIG. 1, an exemplary system for using the flow of heated air from a confined space to generate electricity according to one embodiment of the present disclosure is shown installed beneath the roof of a residential home or house. In this embodiment, the confined space is the attic of the house. As shown in FIG. 1, system 100 is installed between two roof joists 105 and comprises a funnel 101, two generators 102, and a turbine 103. The funnel 101, in air flow communication with the turbine 103, is located below turbine 103 and generators 102. The turbine 103 is in operative association with two generators of electricity 102 and is advantageously located between them.

The funnel 101 has a smaller opening at the top 106 than at the bottom 117 and an inner channel that is open and unobstructed such that the flow of heated air 104 passes through the channel unobstructed. The heated air rises through the funnel 101 where it is accelerated prior to entering the turbine 103. The open and unobstructed inner channel of funnel 101 and the smaller opening 106 at the top cause the natural upwards flow of heated air 104 to accelerate, thus providing sufficient air flow to turn the turbine 103 without the addition or use of a propeller or fan. This is more efficient than systems that use a propeller or fan to accelerate the air flow as it does not require any additional energy to move the air towards the turbine. The heated air entering the turbine 103 causes the turbine blades to rotate. The turbine 103 is connected to generators 102, which generate electricity, thereby harnessing the natural flow of the heated air from within the confined space.

Figure 2:
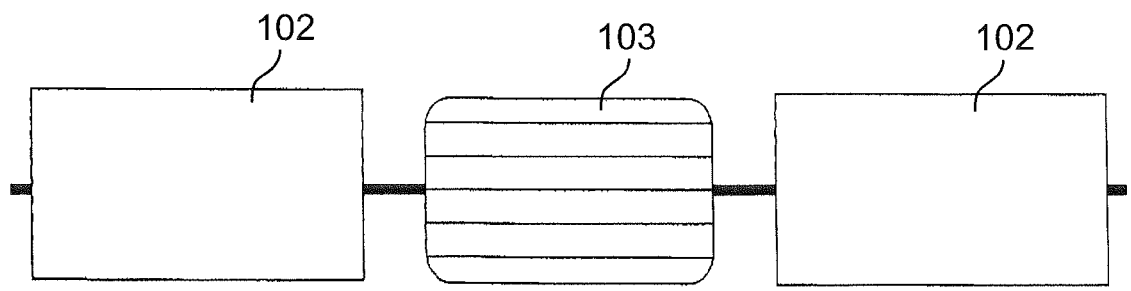
FIG. 2 is an exploded view of the turbine and two generators thereof.

FIG. 2 is an exploded view of the turbine 103 and generators 102. The turbine and generator combination produces the electricity. As the heated air 104 reaches the turbine 103, it rotates the turbine 103 causing the generator 102 to generate electricity. The turbines 103 and generators 102 may be a variety of sizes to fit the desired location or particular application of the present disclosure. The turbine 103 may be larger or smaller than the generators 102, depending on the particular need.

The turbine 103 is a circular shaped object that resembles a paddlewheel and rotates as such. The turbine 103 has foils, or blades that preferably can be cupped to catch and be driven by the heated air flow that is funneled to it. The turbine 103 is designed such that the turbine's 103 rotational speed is self-limiting. Thus, the turbine 103 will not rotate so fast that it destroys itself because the foils create turbulence when rotating at a high speed. With this arrangement, the turbine 103 can never be pushed past its breaking point.

The turbine 103 preferably is located equidistantly between the two generators 102 to provide balance and stability to the system. In some embodiments, a single larger generator 102 may be connected with the turbine 103, for example, if sufficient attic space is not present to accommodate two generators of for a lower cost installation since the larger single generator is of lower cost than two smaller generators. Maintenance costs are also reduced with the single generator arrangement.

The generators of electricity 102 are convention but are preferably designed to use the latest technology available to generate electricity. The generators 102 are in communication with the turbine 103 and produce electricity when high velocity air causes the turbine 103 to rotate. The generators 102 will consist of almost no metal on metal moving parts making the turbine 103/generator 102 system virtually friction free.

Figure 3:
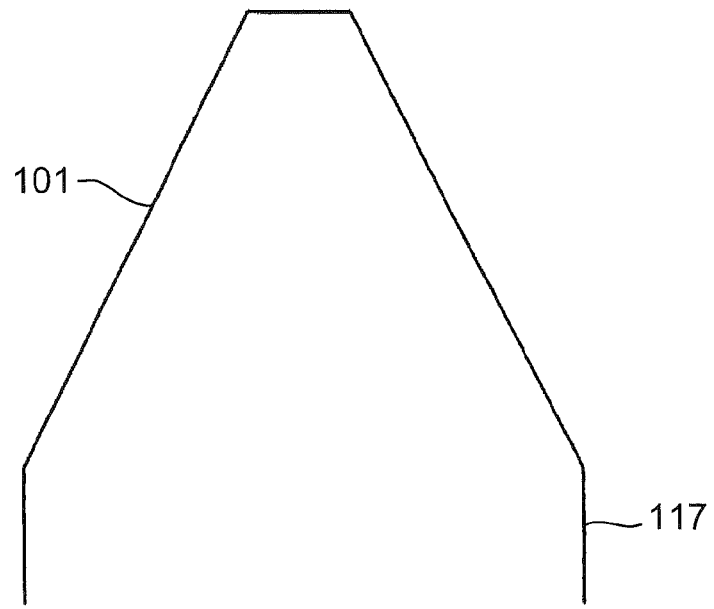
FIG. 3 is an exploded view of the funnel as shown in FIG. 1.

FIG. 3 is an exploded view of the funnel 101. The funnel 101 is connected over soffit vents to capture air. The funnel 101 may have a conical or hyperbolic configuration to provide optimum acceleration of the heated air. The funnel 101 decreases in both width and height as is approaches the turbine 103, thus having a relatively smaller opening at the top 106 than at the bottom 117. The funnel 101 can be constructed of metal or of a non-metal such as PVC or other plastic. All of these materials would be configured to provide light weight to the funnel. Furthermore, the outer and inner surfaces of the should be provided with a dark color such as black. Using a dark colored material causes the funnel 101 to absorb more heat more quickly thus heating the air flow 104 and increasing its velocity. The dark color can be provided as a paid or coating or when plastic materials are used, they can be molded or otherwise pigmented with the desired dark color. The funnel 101 may have two or more sections that can be attached together to construct the funnel to the desired length for the particular installation.

Figure 4:
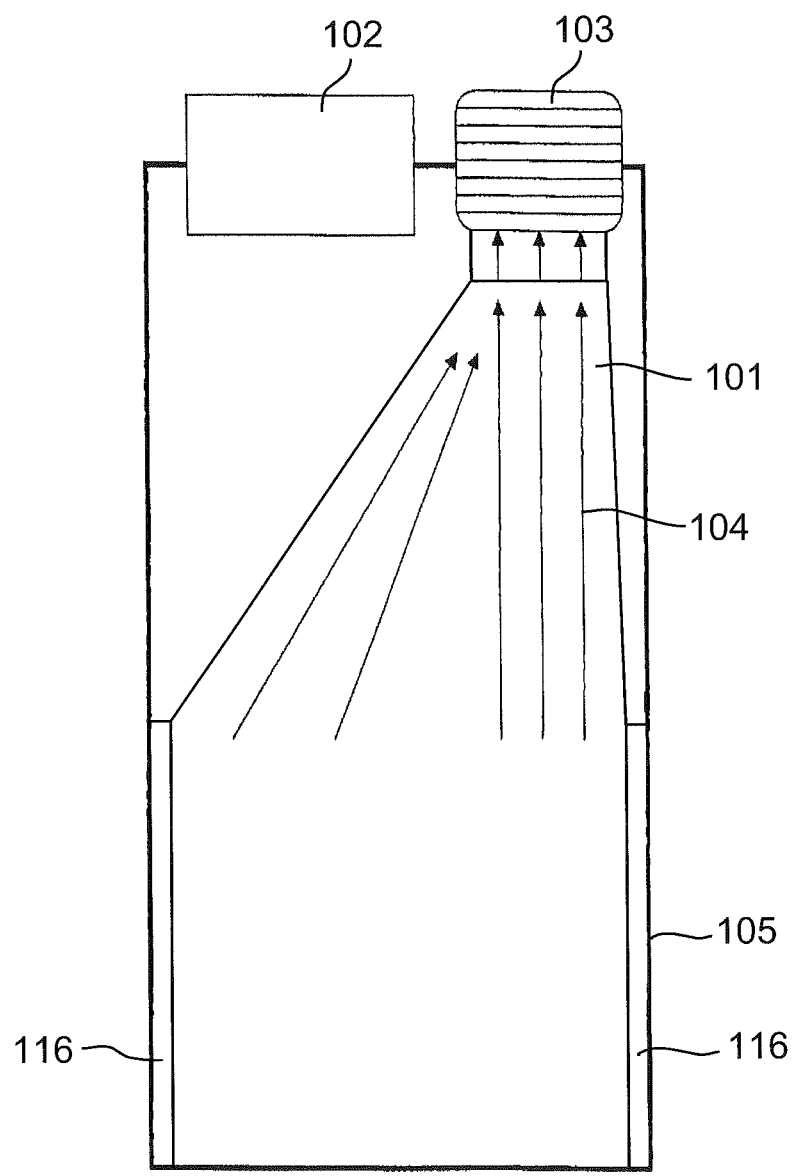
FIG. 4 is a front view similar to FIG. 1 which illustrates an alternative arrangement having only one generator.

In an alternative embodiment, FIG. 4 shows an exemplary system having one generator 102. The funnel 101, the generator 102, and the turbine 103 are installed between the joists of a roof 105. The heated air 104 increases in velocity while traveling through the funnel 101 and to the turbine 103. As the heated air 104 reaches the turbine 103, it rotates the turbine 103 causing the generator 102 to generate electricity.

Figure 5:
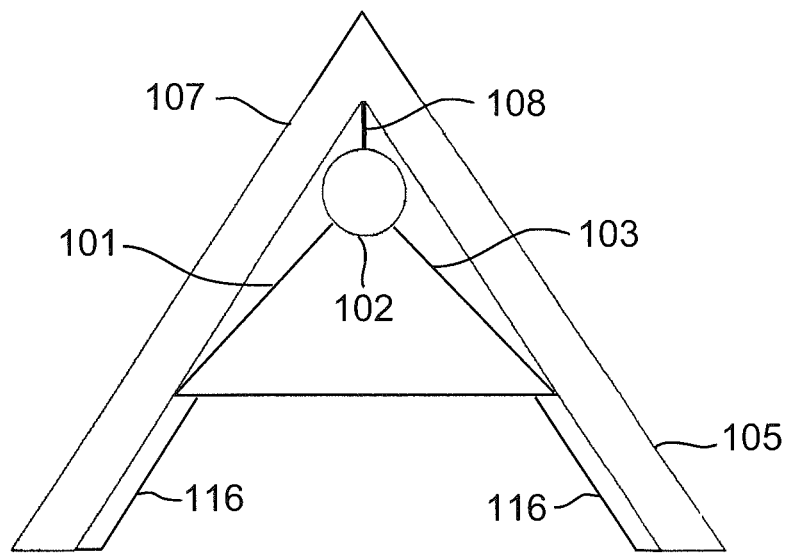
FIG. 5 is a side view of the turbine/generator shown in FIG. 1 that is installed in a roof peak by way of a support bracket.
Figure 6:
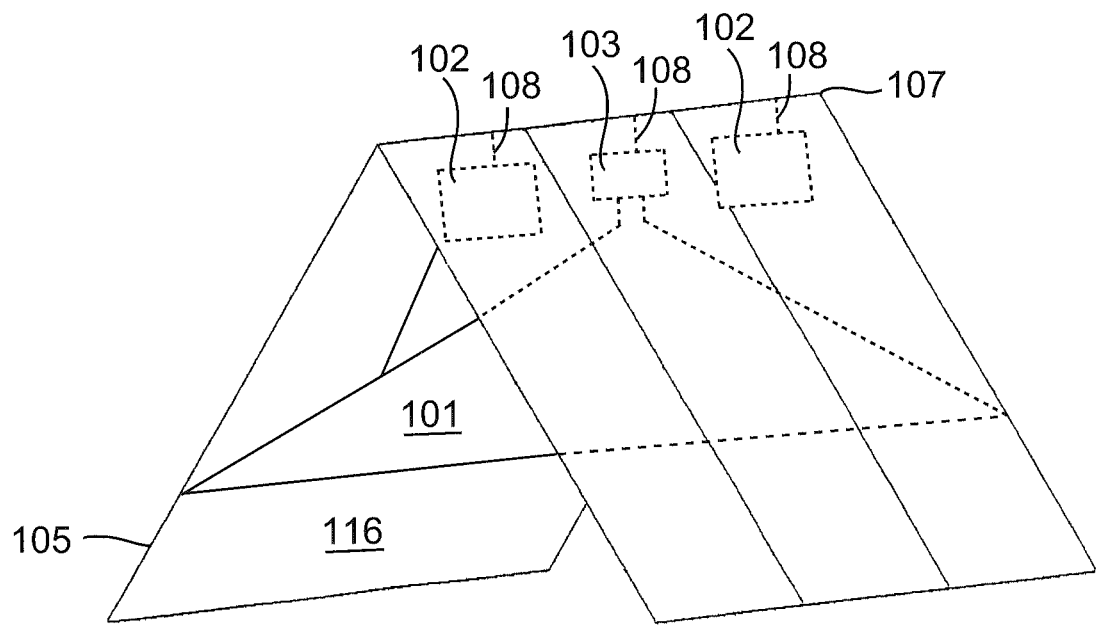
FIG. 6 is a perspective view showing the turbine/generator installed as in FIG. 5.

FIGS. 5 and 6 illustrate an alternative embodiment that shows the system of the present disclosure installed in a roof peak 107. Some homes may have a truss system in the attic or have smaller roof joists 105. In that instance, installing the system between the roof joists 105 would not be practical. As a solution, a larger system is installed adjacent to the peak of the roof 107 using support brackets 108. The system functions the same as the system shown in FIG. 1. The funnel 101 captures, channels, and heats air flow 104 while directing it to the turbine 103. Turbine 103 is connected to the generators 102 which generate electricity.

FIGS. 1, 4, 5 and 6 show the radiant barrier 116 that is attached to the roof joists to help maintain the heated air within the attic. The radiant barrier 116 may be made of any heat reflective material that can be applied to the roof joists or inner surfaces of the attic roof below the funnel as shown. It also can be attached to the attic floor if desired.

Figure 7:
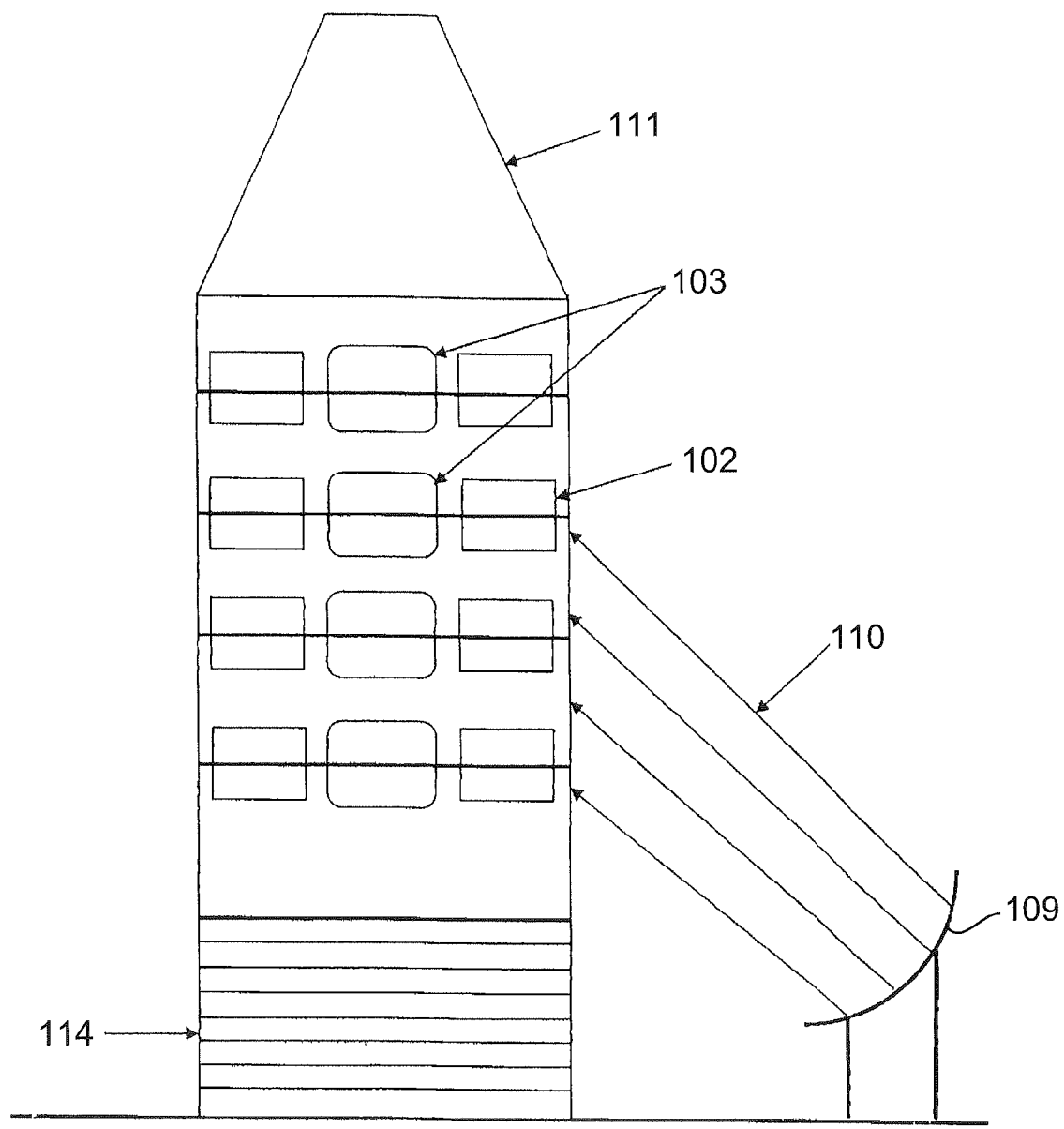
FIG. 7 is a front view of heated air electric generating system installed in a commercial tower that heats the air therein with the addition of a heat reflector.

FIG. 7 shows an alternative embodiment having multiple turbine 103/generator 102 combinations installed in a commercial tower and connected in parallel to provide more electricity. If the system produces more electricity than the building needs, the excess goes back into the power grid. The funnel 101 captures, channels, and heats air flow 104 while directing it to the turbine 103. Turbine 103 is connected to the generators 102 which generate electricity. In all interior home versions of the system, the heated air 104 is vented out through the roof by way of already installed systems, such as wind turbines, ridge vents, or other exhaust system 111, which are included in the system 100 described herein.

The embodiment in FIG. 7 shows the addition of a heat reflector 109 to the system. The heat reflector 109 can be used to concentrate the sun's rays onto enclosed areas of the structure in order to heat the air therein and begin its upward movement towards the turbines. The heat reflector 109 can be added to any of the embodiments described herein. In some embodiments, the heat reflector can be arranged to direct heat from the sun's rays 110 back onto the funnel 101, which further increases the heating of the air and accelerates the velocity of air flow 104 therein.

Figure 8:
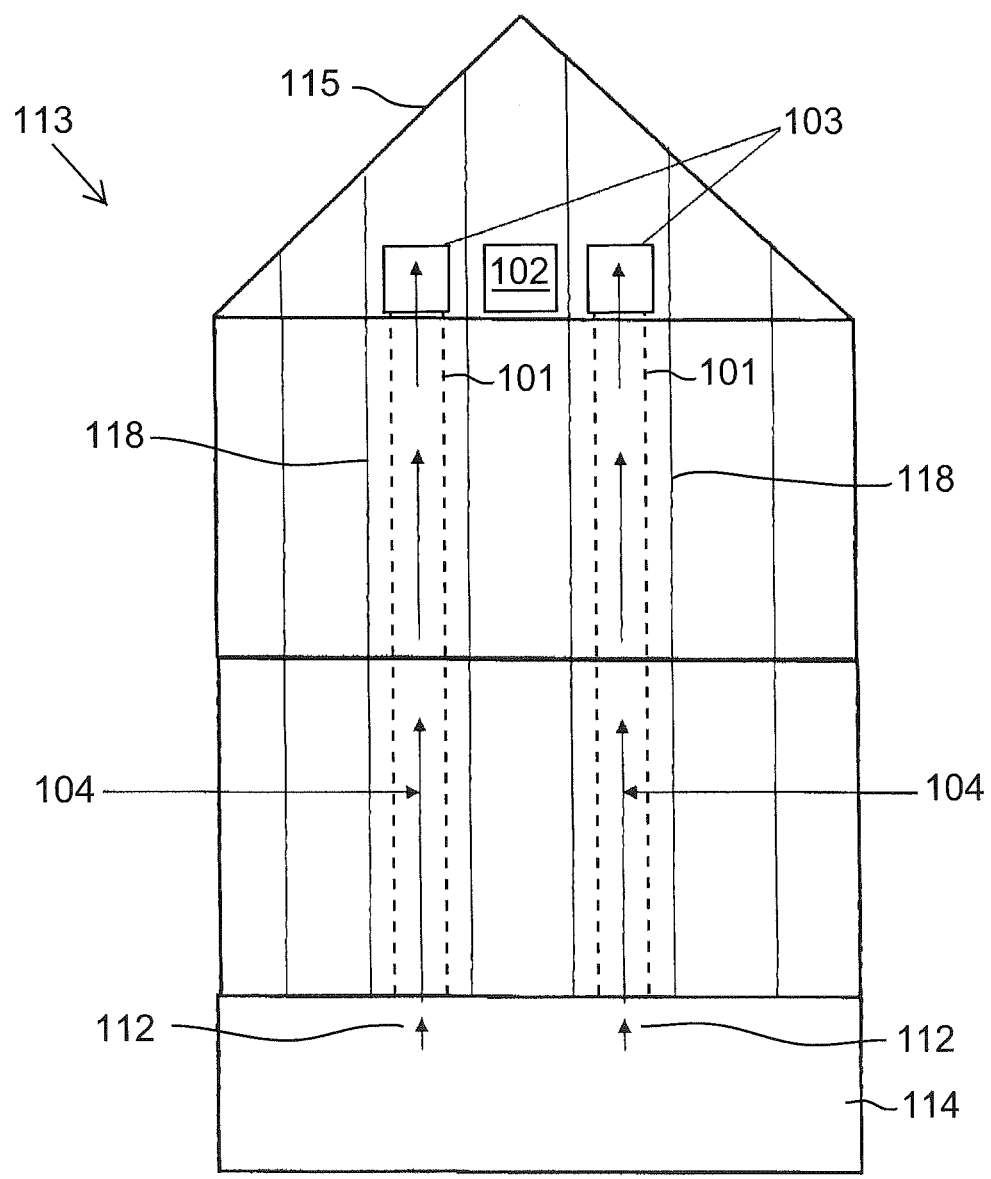
FIG. 8 is a front view of a heated air electric generating system installed from the basement to the attic of a structure.

In yet another embodiment, FIG. 8 shows a system of the present invention that is installed throughout a structure 113 inside an interior wall 118. The air 112 flows from the basement or crawlspace 114 through the building 113 and to the attic 115. The air is warmed to become heated air 104 as it travels through the building. The turbine 103 and generators 102 can be installed between the building's 113 studs. The funnel 101 is installed in closets or finished living space. The funnel directs the heated air 104 to the attic 115 where the turbines 103 and generators 102 are installed. A large turbine 103 and generator 102 combination, such as the one described in FIG. 5, can be used in this embodiment. The wall 118 of building 113 where the system is installed can be insulated normally, but it must have an open area, such as the basement or crawl space 114, from which to draw air into the space and then towards the turbine.

The system can also be installed in an exterior wall on the sunniest side of the building. In that instance, the wall should use a larger framing member such as a 2×6 or 2×8.

The system shown in FIG. 8 can be installed in any home that has more than one floor including the attic 115. The best use of this unit is to run a shaft or chimney from the basement 114 to the attic 115. This shaft becomes a convection tower and allows the movement of heated air 104 up through the house 113 to the turbine 102 located in the attic. The shaft can be hidden in closets that align on the different floors. Because basements 114 are most often cooler than the attic 115, this system takes advantage of the naturally occurring increase in heat in the air flow as the air naturally rises from the basement 114 to the attic 115.

The detailed description of the preferred embodiments contained herein is intended in no way to limit the scope of the invention. Also, the preferred embodiments described above are not mutually exclusive of one another. As will be apparent to a person of ordinary skill in the art, various other modifications and adaptions of the structure above described are possible without departure from the spirit and scope of the invention; the scope of which is defined in the appended claims.

What is claimed is:

1. A system for generating energy from a confined attic space that includes heated air therein, comprising:
    a turbine operatively associated with at least one generator of electricity; and
    a funnel having a relatively smaller chimney top opening disposed spaced apart from the turbine, a relatively larger bottom opening and an inner channel that is open and unobstructed from the bottom opening to the top opening, with the top opening in air flow communication with the turbine so that all heated air rising in the funnel passes through the smaller top opening of the funnel and into the turbine, the inner channel configured for accelerating heated air rising through the channel prior to exiting the top opening and entering the turbine simply due to the travel of the heated air through the inner channel of the funnel and without the use of a fan or propeller to assist in moving the heated air through the funnel, and with the top opening of the funnel terminating at the turbine;
    wherein the accelerated heated air more effectively drives the turbine without requiring additional energy to provide increased amounts of generated electricity and to do so more efficiently compared to turbine systems that do not contain a funnel and fan or propeller, and
    wherein the closed confined attic space is inside an upper interior portion of a building and the turbine and generator are installed in the building in position to receive the accelerated heated air from the funnel.

2. The system of claim 1, wherein the funnel has a conical configuration and is constructed of metal or plastic.

3. The system of claim 1, wherein the funnel includes two or more attachable sections to provide the desired funnel length.

4. The system of claim 1, wherein the turbine comprises curved blades configured to more efficiently be contacted by the accelerated heated air that enters the turbine.

5. The system of claim 1, further comprising a radiant barrier that seals the attic space to maintain the heated air within the attic and wherein the turbine rotational speed is self-limiting.

6. The system of claim 1, wherein multiple turbines and generators are connected in parallel to each other to produce electricity.

7. The system of claim 1, wherein the turbine and generator are installed between roof joists of the building above the confined attic space.

8. The system of claim 1, wherein the turbine and generator are located adjacent the peak of the roof of the building above the confined attic space.

9. The system of claim 1, which is installed interiorly in the confined attic space and the hot air is vented through the roof by attic vents.

10. The system of claim 1, which is installed interiorly in the confined attic space and the hot air is vented through the roof by way of ridge vents.

11. A method of generating energy from a closed confined attic space that includes heated air therein, which comprises:
    providing the confined attic space inside an upper interior portion of a building;
    arranging the system of claim 1 inside the confined attic space in a manner to receive the heated air therein;
    installing the turbine and generator in the confined attic space of the building in position to receive the accelerated heated air from the funnel; and
    accelerating the heated air that rises through the channel due to the travel of the heated air through the inner channel of the funnel without the use of a fan or propeller to assist in moving the heated air through the funnel, and with the top opening of the funnel terminating at the turbine, wherein all heated air rising in the funnel passes through the smaller top opening of the funnel and into the turbine;
    wherein the accelerated heated air more effectively drives the turbine without requiring additional energy to provide increased amounts of generated electricity and to do so more efficiently compared to turbine systems that do not contain a funnel and fan or propeller.

12. The method of claim 11, which further comprises providing the turbine with curved blades configured to more efficiently be contacted by the accelerated heated air that enters the turbine.

13. The method of claim 11, which further comprises providing a radiant barrier that seals the attic space to further heat the increase airflow of the heated air.

14. The method of claim 11, which further comprises connecting multiple turbines and generators in parallel to each other to produce electricity.

* * * * *